April 7, 1942.   A. W. JOHNSON ET AL   2,279,274
BRAKE
Filed Aug. 18, 1938   2 Sheets-Sheet 1
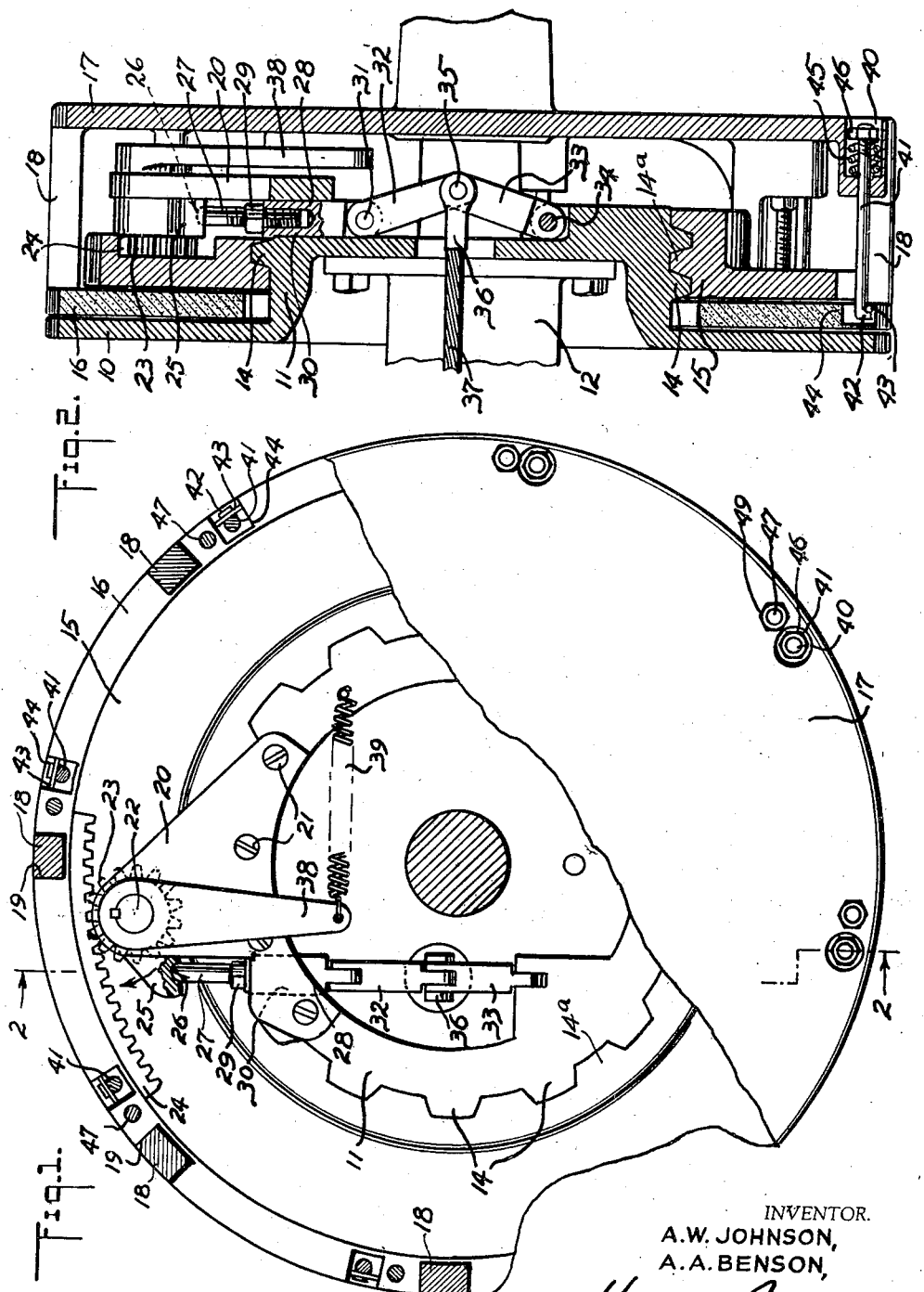
INVENTOR.
A. W. JOHNSON,
A. A. BENSON,
Horace Barnes
ATTORNEY.

April 7, 1942. A. W. JOHNSON ET AL 2,279,274
BRAKE
Filed Aug. 18, 1938 2 Sheets-Sheet 2
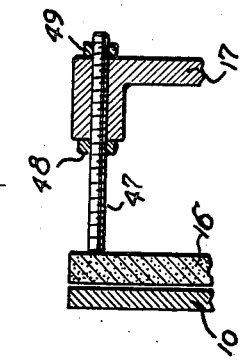
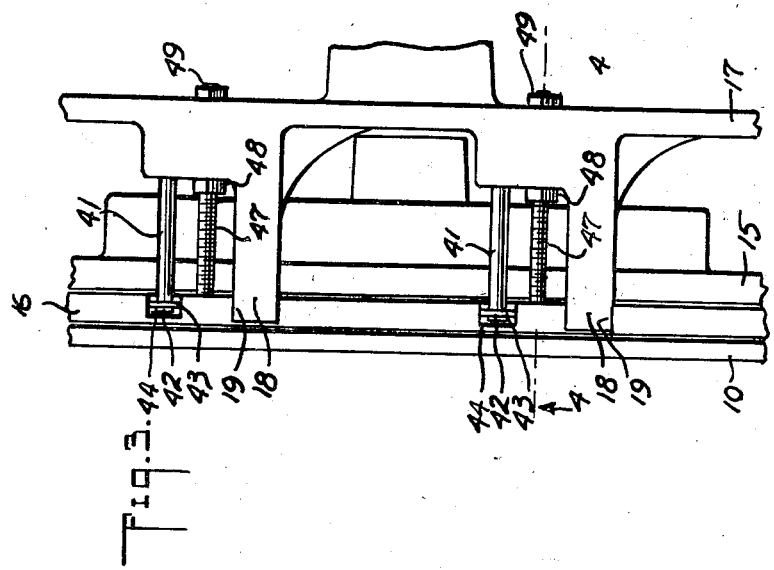
INVENTOR.
A. W. JOHNSON,
A. A. BENSON,
Horace Barnes,
ATTORNEY.

Patented Apr. 7, 1942

2,279,274

UNITED STATES PATENT OFFICE 2,279,274

BRAKE

Arvid W. Johnson and Ary A. Benson,
Los Angeles, Calif.

Application August 18, 1938, Serial No. 225,624

18 Claims. (Cl. 188—72)

This invention relates generally to brakes and more specifically to brakes of the multiple disk type.

It is the purpose of this invention to provide a multiple disk brake by which a smooth, uniform, and powerful braking action can be effected with a negligible amount of manual effort, all while affording the desirable advantages of structural simplicity and compactness, ease of adjustment to compensate for wear which may occur after long service, and ready applicability to a vehicle such as an automobile to provide thoroughly dependable and positive brakes for the wheels thereof.

One form of this invention will now be described, and its novel features then pointed out in claims.

In the accompanying drawings:

Figure 1 is a view showing in front elevation partly broken away, one form of brake embodying this invention.

Fig. 2 is a vertical transverse sectional view taken on the line 2—2 of Fig. 1 and looking in the direction of the arrows.

Fig. 3 is a fragmentary view showing the brake in side elevation.

Fig. 4 is a sectional fragmentary view taken on the line 4—4 of Fig. 3 and looking in the direction of the arrows.

Referring specifically to the drawings wherein similar reference characters designate similar parts in each of the several views, this invention in its present embodiment comprises a non-rotatable member in the form of a circular metal pressure plate 10 having a relatively large hub 11 projecting axially from the outer side thereof, and which is rigidly secured in any suitable manner to the axle-housing 12 of the vehicle so as to be disposed co-axially with the housing.

The outer periphery of the hub 11 is provided with a series of spirally arranged cams or threads 14 on which is mounted a pressure member in the form of a circular metal presser plate 15, formed with internal cams or threads 14a cooperating with cams or threads 14 to the end of providing co-acting means by which rotary movement of the plate 15 in one direction or the other will accordingly move such plate axially towards or away from the plate 10.

A rotary and axially movable friction member in the form of a disk 16, preferably molded of suitable brake-lining material, is interposed between the plate members 10 and 15 and is supported by a frame member 17 rigidly secured to a wheel, not shown, of the vehicle in co-axial relation for rotation with the wheel. The frame 17 is provided at spaced intervals about its circumference with a plurality of laterally projecting arms constituting keys 18 of rectangular cross-section, the inner ends of which are slidably received in recesses 19 formed in the periphery of the friction disk 16 so that the latter will be free for axial movement between the plates 10 and 15 and yet will be keyed to the frame 17 so as to be positively rotated thereby.

A bracket 20 is rigidly secured by screws 21 to the outer face of the hub 11 so as to project radially outward therefrom, and journaled in the bracket is a stub-shaft 22 to which is fixed a gear 23 in mesh with a segmental rack 24 formed on or connected to the pressure plate 15, so that accordingly as the shaft is rotated in one direction or the other the presser plate will be rotated in one direction or the other and hence moved axially towards or away from the plate 10 and disk 16 by the spiral teeth 14.

Fixed to the stub shaft 22 between the bracket 20 and the gear 23 is an arm 25 having a socket 26 in which seats the rounded end of a pin 27 threaded into a block 28 and secured against rotation in the block by a lock nut 29. The block 28 is slidably mounted in a recess 30 formed in the hub 11 and is pivotally connected at 31 to one end of a link 32. A second link 33 is pivoted at 34 on the hub 11 and is pivotally connected at 35 to the link 32 for co-action therewith in forming a toggle operative to advance and retract the block 28, as will be understood. A clevis 36 is connected to the links at 35, and a flexible cable 37 is connected to the clevis for exerting a pull upon the links to straighten the toggle and advance the block 28. The cable is intended to be operatively connected in any suitable manner to a pedal or lever, not shown, for manual actuation. A second arm 38 is fixed to the stub shaft 22 and is normally urged by a spring 39 to rotate the shaft in the direction which will result in the gear 23 and rack 24 co-acting to move the plate 15 axially away from the plate 10 and disk 16 in response to the rotary movement imparted to the presser plate.

At circumferentially spaced intervals, the supporting frame 17 is provided with pockets 40 through which extend rods 41 having hooks 42 on their inner ends engaging pins 43 spanning recesses or slots 44 formed in the friction disk 16, as clearly seen in Fig. 2. Coil springs 45 surround the rods 41 in the pockets 40 and abut heads 46 on the rods to normally urge the friction disk axially away from the fixed plate 10.

Adjacent the rods 41 are stop-screws 47 extending freely through the supporting frame 17 and having nuts 48 and 49 thereon which co-act in securing the stop-screws in selected positions of adjustment.

Under the urging action of the springs 45 the friction disk 16 is normally maintained in engagement with the outer ends of the stop-screws which limit the movement of the friction disk axially away from the plate 10 to a position wherein the friction disk is clear of the plate 10 and is also clear of the presser plate 15 when the latter occupies its retracted position under the action of the spring 39, as shown in Fig. 2. Thus the friction disk will normally be free for rotation by the wheel and will be held against any wobbling movement which would create wear and set up a frictional drag. The adjustability of the stop-screws 47 enables the position wherein the latter limit the friction disk to be varied to compensate for wear occurring on the several plates and disk.

The operation of the brake is as follows:

With the parts of the brake occupying the positions shown in Figs. 1 and 2, the friction disk 16 will be clear of the plates 10 and 15 so that the brake is entirely released. When it is desired to apply the brake a pull is exerted upon the cable 37, causing the toggle-links 32, 33 to co-act in advancing the block 28. As the block is advanced, the pin 27 rocks the arm 25 in the direction of the arrow in Fig. 1, thus imparting corresponding movement to the gear 23, and thereby rotatably moving the presser plate 15 in such direction that the teeth 14 will feed the presser plate axially toward the friction disk 16. As this axial feeding of the presser plate continues, and the presser plate engages the friction disk, the latter will be moved axially into engagement with the plate 10, thus causing the plates 10 and 15 to co-act in producing a braking action upon the friction disk, increasing in intensity as the pressure imposed by the plate 15 is increased. The screw-threads or cams 14 are disposed with an inclination to advance the plate 15 upon the friction disk 16 when the plate 15 is rotated in the same direction as the wheel and friction disk are moving when the vehicle is moving forwardly so that the frictional contact of the engaging disk and plates tends to advance the presser plate and aids in providing a reliable braking effect.

When the cable is released, the spring 39 and the springs 45 restore the parts of the brake to the normal positions shown, so that the brake is again entirely released. It will be manifest that by the provision of this invention any amount of braking action from a minimum to a maximum sufficient to lock the friction disk against rotation, can be effected, and with but a negligible expenditure of manual effort. The brake is self-energizing in action upon contact of the engageable plates and disk and its construction enables it to function as a thoroughly dependable and positive brake for the wheels of an automobile or other vehicle.

A further advantage afforded by our brake construction resides in the provision of the metal plate members 10 and 15 having relatively high heat conductivity positioned upon the outer sides of the friction disk, which is of relatively high frictional characteristic whereby the heat developed in the application of the brake is quickly absorbed and dissipated through such outer plates.

A still further advantage resides in the open construction of the brake at its perimeter, the open spaces between the keys 18 affording free access of the air to aid in cooling the friction disk and plates, as well as providing free discharge of water and dirt thrown from the revolving parts by centrifugal action.

Having described our invention, what we claim is:

1. A brake comprising a non-rotatable member, a rotatable and axially movable pressure member, a rotary and axially movable friction disk interposed between said members, a rack on said pressure member, a pinion in mesh with said rack, an arm connected to said pinion, and means including a toggle mechanism for actuating said arm and rotating said pressure member to move axially towards the non-rotatable member for co-action therewith in braking said friction disk against rotation.

2. A brake comprising a non-rotatioble member, a rotatable and axially movable pressure member, a rotary and axially movable friction disk interposed between said members, a rack on said pressure member, a pinion in mesh with said rack, an arm connected to said pinion, means including a toggle-mechanism for actuating said arm and rotating said pressure member to move axially towards the non-rotatable member for co-action therewith in braking said friction disk against rotation, means for urging the pressure member axially away from the non-rotatable member, and means operable to maintain the friction disk in a position clear of the other members when the pressure member occupies its urged position.

3. A brake comprising a non-rotatable member, a rotatable and axially movable pressure member, a rotary and axially movable friction disk interposed between said members, means for rotating said pressure member to move axially towards the non-rotatable member for co-action therewith in braking said friction disk against rotation, means for urging the pressure member axially away from the non-rotatable member, means for urging the friction disk axially away from the non-rotatable member, and a plurality of screw-threaded stops for limiting movement of the friction-disk axially away from the non-rotatable member to a position wherein the friction disk is clear of the other members when the pressure member occupies its urged position.

4. A brake comprising a non-rotatable member, an axially movable pressure member, a friction disk interposed between said members, means for mounting the friction disk for rotation yet rendering it free for movement axially, circumferentially spaced pins on the friction disk, rods slidably mounted on the mounting means at circumferentially spaced intervals and having hooked engagement with the pins, means for urging the pressure member axially away from the non-rotatable member, coil springs mounted on the rods and coacting therewith to urge the friction disk axially away from the non-rotatable member, and stops on the mounting means engaged by the friction disk to limit movement of the latter axially away from the non-rotatable member to a position wherein the friction disk is clear of the other members when the pressure member occupies its urged position.

5. A brake comprising a non-rotatable member, an axially movable pressure member, a friction disk interposed between said members, means for mounting the friction disk for rotation yet rendering it free for movement axially, rods slidably mounted on the mounting means at circumferentially spaced intervals connected with said friction disk, means for urging the pressure member axially away from the non-rotatable member, coil springs mounted on said rods and co-acting therewith to urge the friction disk axially away from the non-rotatable member, and stops on the mounting means engaged by the friction disk to limit the movement of the latter axially away from the non-rotatable member to a position wherein the friction disk is clear of the other members when the pressure member occupies its urged position.

6. A wheel brake comprising a non-rotatable member formed with a hub provided with screw-threads, a pressure member mounted on said hub and provided with screw-threads in engagement with the threads of said hub, a friction disk slidably connected to rotate with the wheel and positioned between said members to be frictionally engaged thereby, a segmental rack fixed to the pressure member, a gear rotatable about a fixed axis and in mesh with said rack, an arm on said gear, means for actuating said arm to cause the gear and rack to co-act in rotating said pressure member to frictionally engage said disk, a second arm secured to said gear, and a spring connected to said second named arm to urge said gear in direction to retract said pressure member.

7. A wheel brake comprising a non-rotatable pressure member formed with screw-threads, a presser member formed with screw-threads co-acting with the threads of said non-rotatable member, a friction disk slidably connected to rotate with the wheel and positioned between said members to be frictionally engaged thereby, a toothed rack connected to said presser member, a pinion gear engaged with said rack and operable to rotate said presser member upon said threads, and means to actuate said gear including flexible connections extending through said non-rotatable member.

8. A brake, comprising a non-rotatable member having a hub formed with screw-threads, a pressure plate having screw threads in operative engagement with the hub to move axially towards or away from said non-rotatable member upon the rotation in one direction or the other, a friction disk slidably connected to rotate with the wheel and interposed between said members, means to actuate said pressure member, spring actuated rods connected to the friction-disk to withdraw said friction disk away from said non-rotatable member upon the retraction of said pressure member, and stops to limit the withdrawal of said friction disk.

9. A wheel brake comprising a non-rotatable member having an outwardly extending hub formed with screw-threads, a presser member formed with screw-threads co-acting with the threads on said hub, a friction-disk slidably connected to rotate with the wheel and positioned between said members to be frictionally engaged thereby, a bracket fixed to said hub, a shaft rotatably mounted in said bracket, operative means upon said shaft engageable with said presser member to rotatably actuate said presser member upon said hub, and flexible connections extending to the inner side of said non-rotatable member to energize said operative means.

10. A wheel brake comprising a non-rotatable member having an outwardly extending hub formed with screw-threads, a presser member mounted outwardly of said non-rotatable member formed with screw-threads co-acting with the threads of said hub, a friction-disk slidably connected to rotate with the wheel and positioned between said members to be frictionally engaged thereby, means mounted on said non-rotatable member and engageable with said presser member to rotatably actuate said presser member upon said hub, and operative connections for said actuating means extending to the inner side of said non-rotatable member.

11. A wheel brake comprising a non-rotatable member having an outwardly extending hub formed with screw-threads, a presser member mounted outwardly of said non-rotatable member formed with screw-threads co-acting with the threads on said hub, a friction-disk slidably connected to rotate with the wheel and positioned between said members to be frictionally engaged thereby, a bracket fixed to said hub, a shaft rotatably mounted in said bracket, a gear keyed upon said shaft, a toothed rack mounted on said presser member in mesh with said gear, and connective means extending to the inner side of said non-rotatable member to rotatably actuate said shaft to effect the braking engagement of said friction-disk between said members.

12. A wheel brake consisting of a pressure-plate fixedly secured to the wheel-axle having an outwardly directed hub formed with exterior screw-threads, a presser-plate formed with screw-threads co-acting with the threads of said hub, a frame connected to rotate with the wheel and formed with a plurality of inwardly directed arms spaced apart to provide openings to the atmosphere in radial alignment with said plates, a friction-disk interposed between said plates and slidably mounted on said arms to rotate therewith, and means to rotatably actuate said presser-plate upon said hub to frictionally engage the friction-disk between said plates, including flexible connections extending to the inner side of said non-rotatable member.

13. A wheel brake consisting of a pressure-plate fixedly secured to the wheel-axle and having an outwardly directed hub formed with exterior screw-threads, a presser-plate formed with screw-threads co-acting with the threads of said hub, a frame connected to rotate with the wheel and formed with a plurality of inwardly directed arms spaced apart to provide openings therebetween and extending to proximity of said pressure-plate and within the perimeter thereof, a friction-disk interposed between said plates and slidably mounted on said arms to rotate therewith, and means mounted on said hub and co-acting with said presser-plate to rotate the presser-plate upon said hub and frictionally engage the friction-disk between said plates, said means extending to the inner side of the pressure-plate.

14. A wheel brake consisting of a fixed pressure-plate, a rotatable presser-plate, interconnecting means between said plates providing for movement of the presser-plate in an inclined course with respect to the pressure-plate, a rotatable and axially movable friction-disk interposed between said plates, and connected to the wheel, and means mounted on said pressure-plate for actuating said presser-plate and to frictionally engage said friction-disk between said plates, including a flexible cable extending through said pressure-plate.

15. A wheel brake, comprising a non-rotatable member formed with a concentric pressure-plate and a hub provided with screw-threads, a presser plate mounted on said hub provided with screw-threads in engagement with the threads of said hub, a friction disk slidably connected to rotate with the wheel and positioned between said plates to be frictionally engaged thereby, a segmental rack fixed to said presser plate, a gear in mesh with said rack, an arm on said gear, and means engaging said arm and extending through said non-rotatable member to actuate said gear and rack rotating the presser plate to frictionally engage said disk.

16. A wheel brake comprising a non-rotatable member formed with screw-threads, a presser member formed with screw-threads co-acting with the threads of said non-rotatable member, a friction disk slidably connected to rotate with the wheel and positioned between said members to be frictionally engaged thereby, and means for rotating said presser member upon said threads including a toothed rack secured to the presser member, a gear operably engaged with said rack, and flexible connections for actuating said gear.

17. A wheel brake, comprising a non-rotatable pressure plate formed with a hub provided with screw-threads, a presser plate mounted on said hub and provided with screw-threads in engagement with the threads of said hub, a friction disk slidably connected to rotate with the wheel and positioned between said plates to be frictionally engaged thereby, a segmental rack fixed to said presser plate, a gear rotatably mounted in mesh with said rack, an arm on said gear, and means extending through said pressure plate for actuating said arm to cause the gear and rack to co-act in rotating said presser plate to frictionally engage said disk.

18. A wheel brake, comprising a non-rotatable pressure-plate formed with a hub provided with screw-threads, a presser plate mounted on said hub having screw-threads in engagement with the threads of said hub, a toothed rack on said presser plate, a bracket fixedly mounted on said hub, a shaft rotatably mounted in said bracket, a gear on said shaft in mesh with said rack, an arm on said gear, and means for actuating said arm to cause the gear and rack to co-act in rotating said presser plate, said means including flexible connections extending through the pressure-plate.

ARVID W. JOHNSON.
ARY A. BENSON.